US011037556B2

(12) United States Patent
Rangarajan et al.

(10) Patent No.: US 11,037,556 B2
(45) Date of Patent: Jun. 15, 2021

(54) SPEECH RECOGNITION FOR VEHICLE VOICE COMMANDS

(71) Applicant: Ford Global Technologies, LLC, Dearborn, MI (US)

(72) Inventors: Ranjani Rangarajan, Farmington Hills, MI (US); John Edward Huber, Novi, MI (US); Leah N. Busch, Berkley, MI (US); Joshua Wheeler, Trenton, MI (US); Scott Andrew Amman, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 16/037,945

(22) Filed: Jul. 17, 2018

(65) Prior Publication Data

US 2020/0027452 A1 Jan. 23, 2020

(51) Int. Cl.
*G10L 15/22* (2006.01)
*G06F 3/16* (2006.01)
*B60K 35/00* (2006.01)

(52) U.S. Cl.
CPC .............. *G10L 15/22* (2013.01); *B60K 35/00* (2013.01); *G06F 3/167* (2013.01); *B60K 2370/148* (2019.05); *G10L 2015/223* (2013.01)

(58) Field of Classification Search
CPC ......... G10L 15/32; G10L 15/22; G10L 15/08; G10L 15/26; G10L 17/00; G10L 15/19; G10L 15/20; G10L 15/24; G10L 15/16; G10L 15/30; G10L 15/04; G10L 15/183; G10L 17/22; G10L 2015/228; G10L 15/063; G10L 15/193; G10L 2015/085; G10L 2015/223; G10L 2021/02166
See application file for complete search history.

(56) References Cited

U.S. PATENT DOCUMENTS

| | | | |
|---|---|---|---|
| 8,005,668 B2 * | 8/2011 | Arun | G10L 15/22 704/226 |
| 8,688,451 B2 * | 4/2014 | Grost | G10L 15/32 379/88.01 |
| 8,762,142 B2 | 6/2014 | Jeong et al. | |
| 9,093,076 B2 | 7/2015 | Fry | |
| 9,263,058 B2 | 2/2016 | Huang et al. | |
| 9,779,723 B2 | 10/2017 | Panainte et al. | |
| 9,812,125 B2 | 11/2017 | Lee et al. | |
| 2006/0020462 A1 * | 1/2006 | Reich | G10L 15/187 704/254 |
| 2015/0379987 A1 * | 12/2015 | Panainte | H04R 1/08 704/246 |

(Continued)

*Primary Examiner* — Matthew H Baker
(74) *Attorney, Agent, or Firm* — Frank Lollo; Eversheds Sutherland (US) LLP

(57) ABSTRACT

Method and apparatus are disclosed for speech recognition for vehicle voice commands. An example vehicle includes a microphone to collect a signal including a voice command, memory, and a controller. The controller is configured to determine an initial identification by feeding the signal into a first automatic speech recognition (ASR) engine and determine habits by feeding user history into a habits engine. The controller also is configured to identify the voice command by feeding the signal, the initial identification, and the habits into a second ASR engine. The controller also is configured to perform a vehicle function based on the voice command.

19 Claims, 4 Drawing Sheets

(56) References Cited

U.S. PATENT DOCUMENTS

2016/0111090 A1    4/2016  Holdren et al.
2019/0147855 A1*   5/2019  Zhao .................... G10L 15/142
                                                  704/232

* cited by examiner

SPEECH RECOGNITION FOR VEHICLE VOICE COMMANDS

TECHNICAL FIELD

The present disclosure generally relates to speech recognition and, more specifically, to speech recognition for vehicle voice commands.

BACKGROUND

Typically, vehicles include a plurality of features and/or functions that are controlled by an operator (e.g., a driver). Oftentimes, a vehicle includes a plurality of input devices to enable the operator to control the vehicle features and/or functions. For instance, a vehicle may include button(s), control knob(s), instrument panel(s), touchscreen(s), and/or touchpad(s) that enable the operator to control the vehicle features and/or functions. Further, in some instances, a vehicle includes a communication platform that communicatively couples to mobile device(s) located within the vehicle to enable the operator and/or another occupant to interact with the vehicle features and/or functions via the mobile device(s).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for speech recognition for vehicle voice commands. An example disclosed vehicle includes a microphone to collect a signal including a voice command, memory, and a controller. The controller is configured to determine an initial identification by feeding the signal into a first automatic speech recognition (ASR) engine and determine habits by feeding user history into a habits engine. The controller also is configured to identify the voice command by feeding the signal, the initial identification, and the habits into a second ASR engine. The controller also is configured to perform a vehicle function based on the voice command.

In some examples, the controller utilizes the second ASR engine to identify the voice command responsive to determining that the initial identification corresponds with a confidence level that is less than a confidence threshold. In some examples, the controller utilizes the second ASR engine to identify the voice command responsive to determining that a noise level of the signal is greater than a noise threshold. In some examples, the controller identifies the initial identification as the voice command responsive to determining that the initial identification corresponds with a confidence level that is greater than a confidence threshold and a noise level of the signal is less than a noise threshold.

In some examples, the first ASR engine includes an acoustic model to identify one or more phonemes of a dialect within the signal and a language model to identify one or more words within the signal by determining word probability distributions based on the one or more phonemes identified by the acoustic model. In some examples, the second ASR engine includes a deep neural network. In some examples, the habits engine includes a pattern recognition algorithm.

Some examples further include one or more input devices. In such examples, the controller determines the user history based on user inputs received by the one or more input devices.

An example disclosed system includes a vehicle to operate based on a voice command. The vehicle includes a microphone to collect a signal including the voice command. The example disclosed method also includes a remote server, in communication with the vehicle, to determine an initial identification via a first engine based on the signal and determine habits via a habits engine. The remote server also is to identify the voice command for the vehicle via a second engine based on the signal, the initial identification, and the habits.

In some examples, the remote server utilizes the second engine to identify the voice command responsive to determining that the initial identification corresponds with a confidence level that is less than a confidence threshold. In some examples, the remote server utilizes the second engine to identify the voice command responsive to determining that a noise level of the signal is greater than a noise threshold. In some examples, the remote server identifies the initial identification as the voice command responsive to determining that the initial identification corresponds with a confidence level that is greater than a confidence threshold and a noise level of the signal is less than a noise threshold.

In some examples, the first engine includes an acoustic model to identify one or more phonemes of a dialect within the signal and a language model to identify one or more words within the signal by determining word probability distributions based on the one or more phonemes identified by the acoustic model. In some examples, the second engine includes a deep neural network. In some examples, the habits engine includes a pattern recognition algorithm.

In some examples, the vehicle includes one or more input devices. In such examples, the remote server determines user history to be fed into the habits engine based on user inputs received by the one or more input devices.

An example disclosed method includes collecting, via a vehicle microphone, a signal that includes a voice command. The examples disclosed method also includes determining an initial identification by feeding the signal into a first automatic speech recognition (ASR) engine and determining habits by feeding user history into a habits engine. The example disclosed method also includes identifying the voice command by feeding the signal, the initial identification, and the habits into a second ASR engine. The examples disclosed method also includes performing, via a processor, a vehicle function based on the voice command.

In some examples, the voice command is identified via the second ASR engine responsive to determining that the initial identification corresponds with a confidence level that is less than a confidence threshold. In some such examples, the voice command is identified via the second ASR engine responsive to determining that a noise level of the signal is greater than a noise threshold. Further, some such examples further include identifying the initial identification as the voice command responsive to determining that the confidence level that is greater than the confidence threshold and the noise level of the signal is less than the noise threshold.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
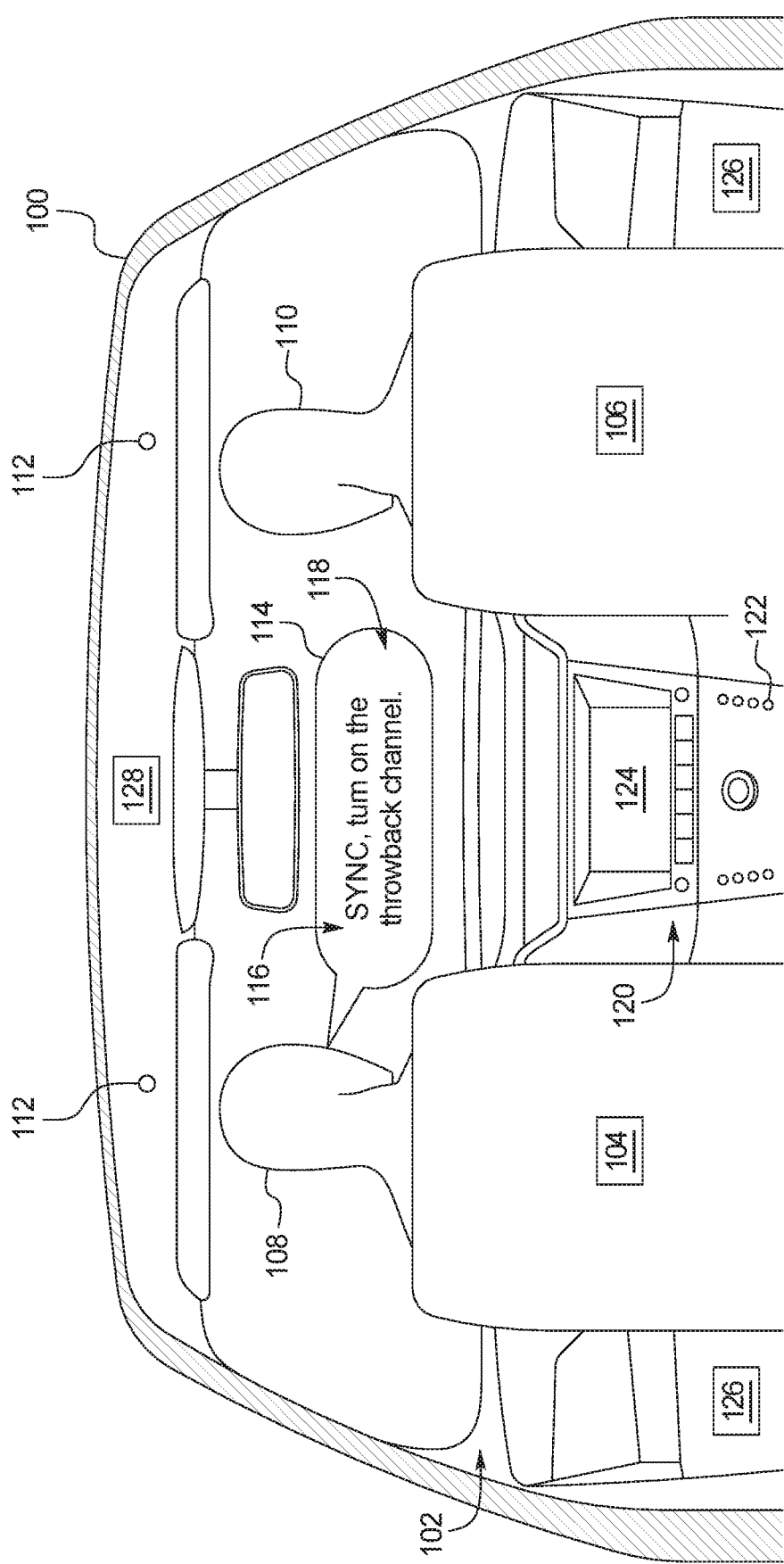
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include a plurality of features and/or functions that are controlled by an operator (e.g., a driver). Oftentimes, a vehicle includes a plurality of input devices to enable the operator to control the vehicle features and/or functions. For instance, a vehicle may include button(s), control knob(s), instrument panel(s), touchscreen(s), and/or touchpad(s) that enable the operator to control the vehicle features and/or functions. Further, in some instances, a vehicle includes a communication platform that communicatively couples to mobile device(s) located within the vehicle to enable the operator and/or another occupant to interact with the vehicle features and/or functions via the mobile device(s).

Recently, some vehicles include microphone(s) that enable an operator located within a cabin of the vehicle to audibly interact with vehicle features and/or functions (e.g., via a digital personal assistant). For instance, such vehicles use a speech-recognition software (e.g., a speech-recognition engine) to identify a voice command of a user that is captured by the microphone(s). In some instances, such speech-recognition software potentially may be unable to accurately identify a voice command given by a user due to, for example, unfamiliarity with the voice command, loud ambient noise, mumbled speech by the user, etc. Further, in some instances, the acoustic models, the speech-recognition software potentially may take up a very large amount of storage space. In turn, the robustness of speech-recognition software stored within the memory of the vehicle potentially may be limited due to the limited embedded storage capabilities within a vehicle. Example methods and apparatus disclosed herein include multiple speech-recognition engines that improve the robustness of speech-recognition software for voice commands for a vehicle in a manner that limits the processing power, memory, and computing time utilized to do so.

Examples disclosed herein include a first automatic speech-recognition (ASR) engine, a second ASR engine, and a habits engine. For example, the first ASR engine includes an acoustic model and language model that are configured to detect a voice command within an audio signal captured by a vehicle microphone, and the second ASR engine includes a deep neural network that is configured to detect the voice command within the audio signal. Further, the habits engine includes, for example, a pattern recognition algorithm (e.g., k-means clustering, principal component analysis, an artificial neural network such as a deep neural network, etc.) to identify habits of a user that provided the voice command. Initially, a controller feeds the audio signal into the first ASR engine to determine an initial identification of the voice command. If (1) the initial identification corresponds with a confidence level that is greater than a confidence threshold and (2) a noise level (e.g., a decibel level) of the audio signal is less than a noise threshold, a controller identifies the initial identification as the voice command. Otherwise, to increase the robustness of the speech-recognition system, a controller utilizes a combination of the first ASR engine, the second ASR engine, and the habits engine to identify the voice command if (1) the initial identification corresponds with a confidence level that is less than the confidence threshold and/or (2) the noise level signal is greater than the noise threshold. For example, a controller is configured to feed the audio signal captured by the microphone, the output of the first ASR engine, and the output of the habits engine into the second ASR engine to identify the voice command provided by the user. Upon identifying the voice command, a controller of the vehicle performs a vehicle function based on the voice command.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). The vehicle 100 of the illustrated example includes a cabin 102 in which a driver's seat 104 and a passenger seat 106 are located. In the illustrated example, an operator 108 (e.g., a driver) is seated in the driver's seat 104, and a passenger 110 is seated in the passenger seat 106.

The vehicle 100 also includes one or more microphones 112. The microphones 112 are audio input devices that are configured to collect audio signals (e.g., voice commands, telephonic dialog, and/or other information) from within the cabin 102. In the illustrated example, one or more of the microphones 112 collect an audio signal 114 from the operator 108 that includes a wake-up term 116 and a voice command 118. The operator 108 provides the wake-up term 116 to indicate to a voice command system that the operator 108 is about to provide the voice command 118. That is, the wake-up term 116 precedes the voice command 118 in the audio signal 114. The wake-up term 116 can be any word or phrase preselected by the manufacturer or the driver, such as an uncommon word (e.g., "SYNC"), an uncommon name (e.g., "Boyle"), and/or an uncommon phrase (e.g., "Hey SYNC," "Hey Boyle"). Additionally, the voice command 118 includes a request to perform a vehicle function, such as providing information to the operator 108 and/or other occupant(s) of the vehicle 100. Example requested information includes directions to a desired location, information within an owner's manual of the vehicle 100 (e.g., a factory-recommended tire pressure), vehicle characteristics data (e.g., fuel level), and/or data stored in an external network (e.g., weather conditions). Other example vehicle functions include starting a vehicle motor, locking and/or unlocking vehicle doors, opening and/or closing vehicle windows, adding an item to a to-do or grocery list, sending a text message, initiating a phone call, etc.

In the illustrated example, the vehicle 100 also includes a human-machine interface (HMI) unit 120. For example, the HMI unit 120 provides an interface between the vehicle 100 and user(s), such as the operator 108 and/or the passenger 110. The HMI unit 120 includes one or more input devices 122 (e.g., digital interfaces, analog interfaces) to receive input from the user(s). The input devices 122 include, for example, a control knob, an instrument panel, a digital camera for image capture and/or visual command recognition, a touchscreen, buttons, a touchpad, etc. Further, the HMI unit 120 includes one or more output devices (e.g., digital interfaces, analog interfaces) to provide output to the user(s). The output devices may include instrument cluster outputs (e.g., dials, lighting devices), actuators, a heads-up display, etc. In the illustrated example, the output devices include a center console display 124 (e.g., a liquid crystal display (LCD), an organic light emitting diode (OLED) display, a flat panel display, a solid state display, etc.) to present information visually to the user(s) and speakers 126 to present information audibly to the user(s). In the illustrated example, the HMI unit 120 includes hardware (e.g., a processor or controller, memory, storage, etc.) and software (e.g., an operating system, etc.) for an infotainment system (such as SYNC® and MyFord Touch® by Ford®). Additionally, the HMI unit 120 displays the infotainment system on, for example, the center console display 124.

The vehicle 100 of the illustrated example also includes a voice command controller 128 that is configured to perform a vehicle function based on the voice command 118 provided by the operator 108. The voice command controller 128 performs the vehicle function upon the voice command controller 128 of the vehicle 100 and/or a voice command controller of a remote server (e.g., a voice command controller 318 of a remote server 314 of FIG. 3) identifies the voice command 118 provided by the operator 108.

Figure 2:
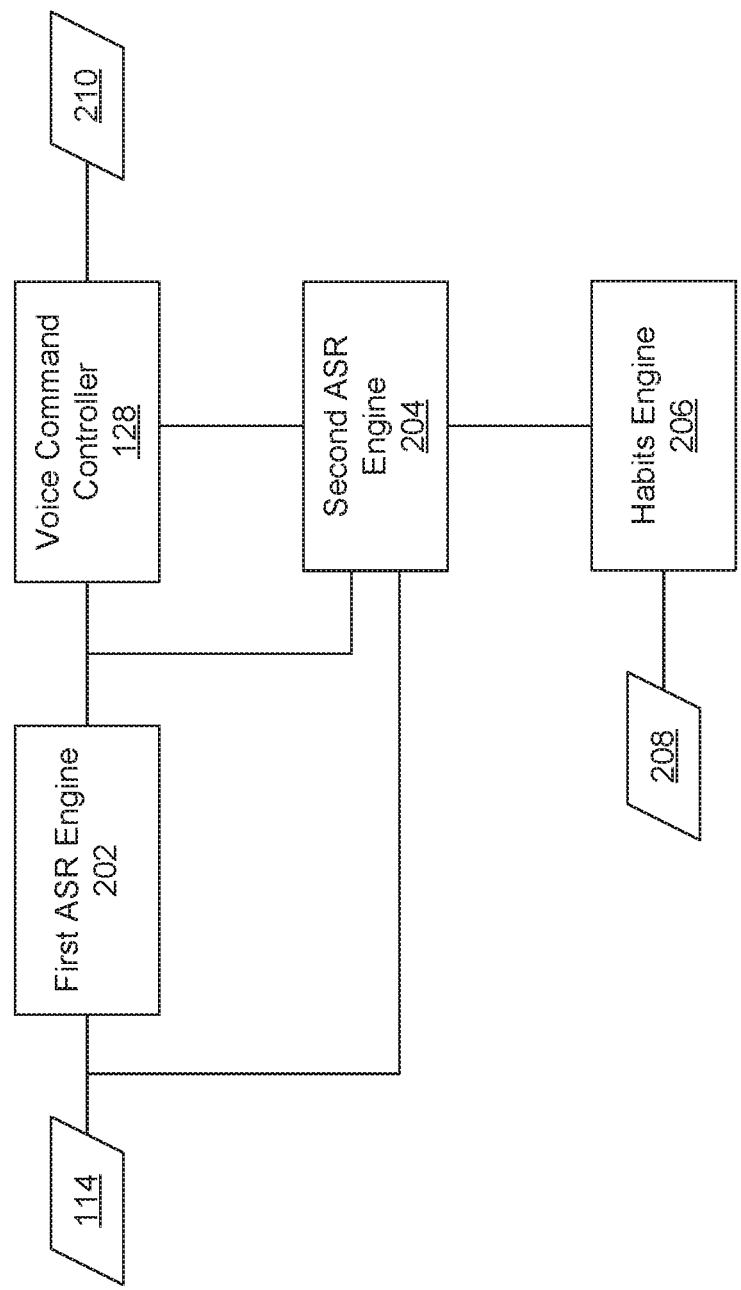
FIG. 2 is a block diagram of speech recognition engines that identify voice commands for the vehicle of FIG. 1.

FIG. 2 is a block diagram of the voice command controller 128, a first speech recognition engine 202, a second speech recognition engine 204, and a habits engine 206 that are configured to identify voice commands (e.g., the voice command 118) for the vehicle 100. As used herein, an "engine" refers to structured machine code that is stored in memory and executed by a processor to perform a function. For example, the voice command controller 128 utilizes the first speech recognition engine 202 and/or the second speech recognition engine 204 to identify the voice command 118 and utilizes the habits engine 206 to identify habits of the user (e.g., the operator 108) who provided the voice command 118.

The first speech recognition engine 202 (also referred to as a first ASR engine and a first engine) is configured to identify the voice command 118 within the audio signal 114. In the illustrated example, the first speech recognition engine 202 includes an acoustic model and a language model to identify the voice command 118 within the audio signal 114. For example, the acoustic model is configured to identify one phonemes of a dialect within the audio signal 114, and the language model is configured to identify one or more words within the audio signal 114 by determining word probability distributions based on the one or more phonemes identified by the acoustic model.

As used herein, an "acoustic model," a "dialect model," and a "dialect acoustic model" refer to an algorithm that is configured to identify one or more phonemes of a dialect within an audio sample to enable the identification of words within the audio sample. As used herein, a "dialect" refers to a variety or subclass of a language that includes characteristic(s) (e.g., accents, speech patterns, spellings, etc.) that are specific to a particular subgroup (e.g., a regional subgroup, a social class subgroup, a cultural subgroup, etc.) of users of the language. As used herein, a "phoneme" refers to a unique sound of speech. Example dialects of the English language include British English, Cockney English, Scouse English, Scottish English, American English, Mid-Atlantic English, Appalachian English, Indian English, etc.

As used herein, a "language model" refers to an algorithm that is configured to identify one or more words within an audio sample by determining word probability distributions based upon one or more phonemes identified by an acoustic model. As used herein, a "language" refers to a system of communication between people (e.g., verbal communication, written communication, etc.) that utilizes words in a structured manner. Example languages include English, Spanish, German, etc.

The habits engine 206 is configured to determine habits of the user (e.g., the operator 108) who provided the voice command 118 based on user history 208 corresponding with the user. In the illustrated example, the habits engine 206 includes a pattern recognition algorithm, such as a machine learning algorithm, to determine the habits of the user. Machine learning algorithms are a form of artificial intelligence (AI) that enables a system to automatically learn and improve from experience without being explicitly programmed by a programmer for a particular function. For example, machine learning algorithms access data and learn from the accessed data to improve performance of a particular function. In some examples, the pattern recognition algorithm of the habits engine 206 includes k-means clustering, Markov models, principal component analysis, decision trees, support vectors, Bayesian networks, sparse dictionary learning, rules-based machine learning, an artificial neural network (e.g., a deep neural network), and/or any other pattern recognition algorithm that is configured to determine habits of a user.

To determine the habits of the user, the voice command controller 128 is configured to feed the user history 208 (also referred to as user history data, user input history, and user input history data) into the habits engine 206. For example, the user history 208 collected by the voice command controller 128 includes previous driving behavior, voice commands, use of the input devices 122, etc. In some examples, the user history 208 includes a time of day, a day of the week, and/or a GPS location at which the driving behavior, voice commands, use of the input devices 122, etc. is performed. Further, in some examples, the voice command controller 128 is scheduled to feed the user history 208 into the habits engine 206 once every predetermined number of inputs received from the user (e.g., between about 10 and 15 received inputs) to determine updated habits of the user on a regular basis.

The second speech recognition engine 204 (also referred to as a second ASR engine and a second engine) is configured to identify the voice command 118 within the audio signal 114. In the illustrated example, the second speech recognition engine 204 includes a deep neural network to identify the voice command 118 within the audio signal 114. For example, the deep neural network functions as an acoustic model and a language model to identify the voice command 118 within the audio signal 114. A deep neural network is a form of an artificial neural network that includes multiple hidden layers between an input layer (e.g., the audio signal 114) and an output layer (the identified language and the dialect). An artificial neural network is a type of machine learning model inspired by a biological neural network. For example, an artificial neural network includes a collection of nodes that are organized in layers to perform a particular function (e.g., to categorize an input). Each node is trained (e.g., in an unsupervised manner) to receive an input signal from a node of a previous layer and provide an output signal to a node of subsequent layer. For example, the deep neural network of the second speech recognition engine 204 is trained on previous speech of the user, previous outputs of the first speech recognition engine 202, and previous outputs of the habits engine 206.

In operation, the voice command controller 128 monitors for the wake-up term 116 upon collecting the audio signal 114. In some examples, the voice command controller 128 extracts the audio signal 114 from a controller area network (CAN) bus of the vehicle 100 (e.g., a vehicle data bus 308 of FIG. 3). The voice command controller 128, for example, feeds the audio signal 114 into the first speech recognition engine 202 to detect the wake-up term 116 within the audio signal 114. Upon detecting the wake-up term 116, the voice command controller 128 is triggered to monitor for the voice command 118.

For example, upon detecting the wake-up term 116, the voice command controller 128 initially feeds the audio signal 114 into the first speech recognition engine 202 to determine an initial identification of the voice command 118. In some examples, the voice command controller 128 feeds the audio signal 114 into the first speech recognition engine 202 to simultaneously detect the wake-up term 116 and determine the initial identification. In other examples, the voice command controller 128 feeds the audio signal 114 into the first speech recognition engine 202 a first time to detect the wake-up term 116 and, upon detecting the wake-up term 116, subsequently feeds the audio signal 114 into the first speech recognition engine 202 a second time to determine the initial identification.

The first speech recognition engine 202 also determines a confidence level that corresponds with the initial identification. For example, a high confidence level indicates an increased probability that the initial identification matches the voice command 118, and low confidence level indicates a reduced probability that the initial identification matches the voice command 118. Upon determining the initial identification of the voice command 118, the voice command controller 128 compares the confidence level of the initial identification to a predetermined confidence threshold.

Further, the voice command controller 128 compares a noise level (e.g., a decibel level) of the audio signal 114 captured by one or more of the microphones 112 to a predetermined noise threshold (e.g., 80 decibel levels). For example, the noise level of the audio signal 114 may be elevated due to ambient noise from outside the vehicle 100 and/or within the cabin 102 of the vehicle 100 such as audio emitted by the speakers 126, speech of other occupants (e.g., the passenger 110), etc.

In response to the voice command controller 128 determining that (1) the confidence level for the initial identification is greater than the predetermined confidence threshold and (2) the noise level is less than the predetermined noise threshold, the voice command controller 128 identifies the initial identification made by the first speech recognition engine 202 as an identified voice command 210. That is, the voice command controller 128 determines that first speech recognition engine 202 has accurately identified the voice command 118 within the audio signal 114.

Otherwise, in response to the voice command controller 128 determining that (1) the confidence level for the initial identification is less than the predetermined confidence threshold and/or (2) the noise level is greater than the predetermined noise threshold, the voice command controller 128 proceeds to utilize the second speech recognition engine 204 to identify the identified voice command 210. For example, the voice command controller 128 utilizes the deep neural network of the second speech recognition engine 204 to increase the accuracy of the identified voice command 210. Further, the voice command controller 128 utilizes a two-step approach in which the second speech recognition engine 204 is utilized only upon determining that the first speech recognition engine 202 potentially may not have accurately identified the voice command 118 to reduce the processing power, memory, and computing time associated with use of a deep neural network. To determine the identified voice command 210 utilizing the second speech recognition engine 204, the voice command controller 128 feeds (1) the audio signal 114, (2) the initial identification made by the first speech recognition engine 202, and (3) the habits of the user identified by the habits engine 206 into the second speech recognition engine 204.

In the illustrated example, the voice command controller 128 on-board the vehicle 100 utilizes the first speech recognition engine 202, the second speech recognition engine 204, and the habits engine 206 stored in memory (e.g., memory 312 of FIG. 3) on-board the vehicle 100. In other examples, the vehicle 100 utilizes cloud computing to reduce the amount of on-board memory utilized for speech recognition. For example, the voice command controller 128 of the vehicle 100 communicates the audio signal 114 and the user history 208 to a remote server (e.g., a remote server 314 of FIG. 3) to enable a controller of the remote server (e.g., a voice command controller 318 of FIG. 3) to utilize the first speech recognition engine 202, the second speech recognition engine 204, and the habits engine 206 that is stored in memory (e.g., memory 320 of FIG. 3) at the remote server. Additionally or alternatively, the vehicle 100 utilizes a combination of on-board computing and cloud computing to identify the voice command 118 within the audio signal 114. For example, one or more of the engines (e.g., the second speech recognition engine 204 and the habits engine 206) is stored in memory on-board the vehicle 100 and one or more of the engines (e.g., the first speech recognition engine 202) is stored in memory at a remote server.

Figure 3:
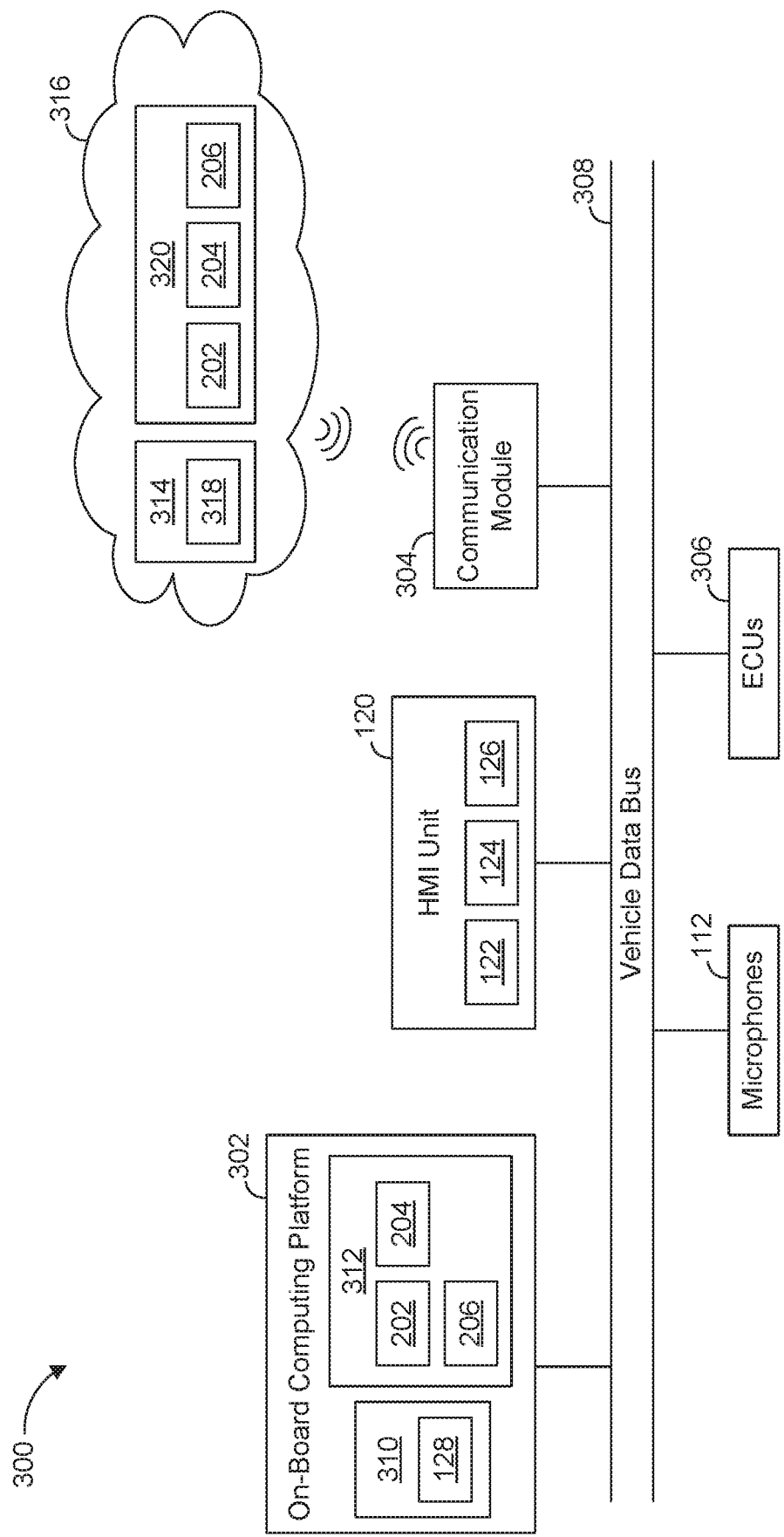
FIG. 3 is a block diagram of electronic components of the vehicle of FIG. 1.

FIG. 3 is a block diagram of electronic components 300 of the vehicle 100. In the illustrated example, the electronic components 300 include an on-board computing platform 302, the HMI unit 120, a communication module 304, the microphones 112, electronic control units (ECUS) 306, and a vehicle data bus 308.

The on-board computing platform 302 includes a processor 310 (also referred to as a microcontroller unit and a controller) and memory 312. For example, the processor 310 of the on-board computing platform 302 is structured to include the voice command controller 128, and the memory 312 is configured to store the first speech recognition engine 202, the second speech recognition engine 204, and the habits engine 206. In other examples, the voice command controller 128, the first speech recognition engine 202, the second speech recognition engine 204, and/or the habits engine 206 is incorporated into other ECU(s) with their own processor(s) and memory.

The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The communication module 304 includes wired or wireless network interfaces to enable communication with external networks. The communication module 304 also includes hardware (e.g., processors, memory, storage, antenna, etc.) and software to control the wired or wireless network interfaces. In the illustrated example, the communication module 304 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication module 304 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

For example, the communication module 304 is communicatively coupled to a remote server 314 of an external network 316. As illustrated in FIG. 3, the remote server 314 includes a voice command controller 318 and memory 320 includes the first speech recognition engine 202, the second speech recognition engine 204, and the habits engine 206.

The memory 320 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 320 includes multiple kinds of memory, particularly volatile memory and non-volatile memory. The memory 320 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 320, the computer readable medium, and/or within the remote server 314 during execution of the instructions.

The communication module 304 enables the vehicle 100 to utilize cloud computing for speech recognition of voice commands. For example, the voice command controller 128 of the vehicle 100 collets the audio signal 114 and the user history 208 and communicates the audio signal 114 and the user history 208 to the remote server 314 via the communication module 304. The voice command controller 318 of the remote server 314 is configured to determine the initial identification via the first speech recognition engine 202 based on the audio signal 114; determine habits of user via the habits engine 206 based on the user history 208; and/or determine the identified voice command 210 for the vehicle 100 via the second speech recognition engine 204 based on the audio signal 114, the initial identification, and the habits.

In the illustrated example, the voice command controller 318 of the remote server 314 is configured to feed the audio signal 114 into the first speech recognition engine 202 to determine the initial identification. Further, the voice command controller 318 is configured to feed the user history 208 into the habits engine 206 to determine the habits of the user. The voice command controller 318 of the illustrated example also is configured to feed the audio signal 114, the initial identification, and the identified habits into the second speech recognition engine 204 to determine the identified voice command 210.

For example, in response to the voice command controller 318 determining that (1) a confidence level for the initial identification is greater than the predetermined confidence threshold and (2) a noise level of the audio signal 114 is less than the predetermined noise threshold, the voice command controller 318 identifies the initial identification made by the first speech recognition engine 202 as an identified voice command 210. Otherwise, in response to the voice command controller 318 determining that (1) the confidence level is less than the predetermined confidence threshold and/or (2) the noise level is greater than the predetermined noise threshold, the voice command controller 318 utilizes the second speech recognition engine 204 to identify the identified voice command 210. Upon the remote server 314 determining the identified voice command 210, the voice command controller 128 of the vehicle 100 receives the identified voice command 210 from the remote server 314 via the communication module 304 and performs a vehicle function based on the identified voice command 210.

The ECUs 306 monitor and control the subsystems of the vehicle 100 to perform vehicle functions. For example, the ECUs 306 are in communication with the voice command controller 128 to operate the vehicle 100. The ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have dozens of the ECUs 306 that are positioned in various locations around the vehicle 100 and are communicatively coupled by the vehicle data bus 308.

The vehicle data bus 308 communicatively couples the microphones 112, the HMI unit 120, the on-board computing platform 302, the communication module 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
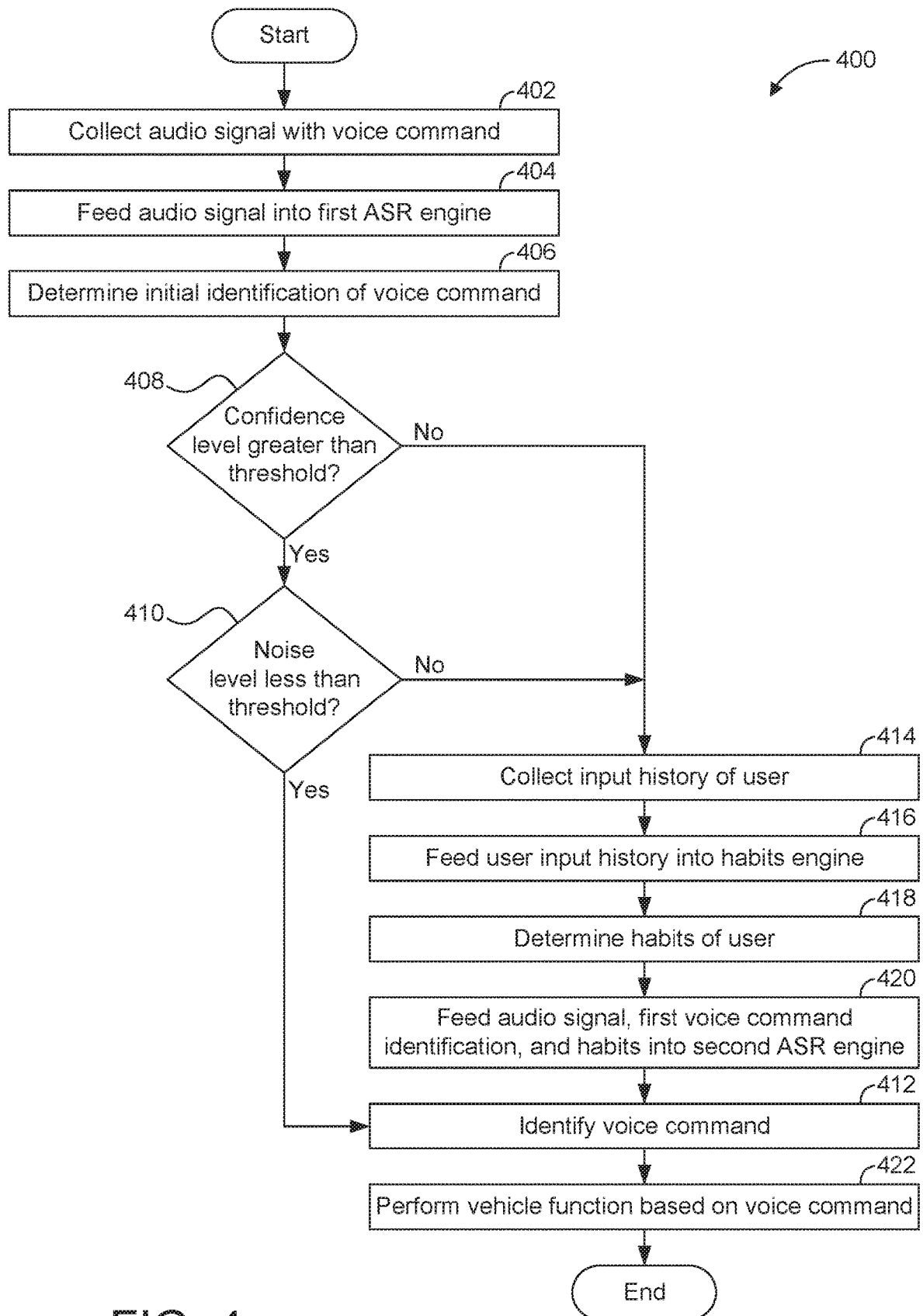
FIG. 4 is a flowchart for identifying a voice command for a vehicle via speech recognition in accordance with the teachings herein.

FIG. 4 is a flowchart of an example method 400 to identify a voice command for a vehicle via speech recognition. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 and/or the remote server 314 to implement the example voice command controller 128, the example first speech recognition engine 202, the example second speech recognition engine 204, the example habits engine 206, and/or the example voice command controller 318 of FIGS. 1-3. While the example program is described with reference to the flowchart illustrated in FIG. 4, many other methods of implementing the example voice command controller 128, the example first speech recognition engine 202, the example second speech recognition engine 204, the example habits engine 206, and/or the example voice command controller 318 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, one or more of the microphones 112 collects the audio signal 114 that includes the voice command 118. At block 404, the voice command controller 128 and/or the voice command controller 318 feeds the audio signal 114 into the first speech recognition engine 202. At block 406, the voice command controller 128 and/or the voice command controller 318 determines an initial identification of the identified voice command 210 based upon the application of the first speech recognition engine 202.

At block 408, the voice command controller 128 and/or the voice command controller 318 determines whether the confidence level corresponding with the initial identification is greater than a predetermined confidence threshold. In response to the voice command controller 128 and/or the voice command controller 318 determining that the confidence level is not greater than the predetermined confidence threshold, the method 400 proceeds to block 414. Otherwise, in response the voice command controller 128 and/or the voice command controller 318 determining that the confidence level is greater than the predetermined confidence threshold, the method 400 proceeds to block 410.

At block 410, the voice command controller 128 and/or the voice command controller 318 determines whether a noise level of the audio signal 114 is less than a predetermined noise threshold. In response to the voice command controller 128 and/or the voice command controller 318 determining that the noise level is not less than the predetermined noise threshold, the method 400 proceeds to block 414. Otherwise, in response the voice command controller 128 and/or the voice command controller 318 determining that the noise level is less than the predetermined confidence threshold, the method 400 proceeds to block 412.

At block 412, the voice command controller 128 and/or the voice command controller 318 determines the identified voice command 210. For example, upon (1) determining at block 408 that the confidence level is greater than the predetermined confidence threshold and (2) determining at block 410 that the noise level is less than the predetermined noise threshold, the voice command controller 128 and/or the voice command controller 318 identifies the initial identification made by the first speech recognition engine 202 as the identified voice command 210.

Returning to block 414, the voice command controller 128 and/or the voice command controller 318 collects the user history 208 for the user (e.g., the operator 108) that provided the voice command 118 within the audio signal 114. At block 416, the voice command controller 128 and/or the voice command controller 318 feeds the user history 208 of the user into the habits engine 206. At block 418, the voice command controller 128 and/or the voice command controller 318 determines habits of the user based upon the application of the first speech recognition engine 202.

At block 420, the voice command controller 128 and/or the voice command controller 318 feeds (1) the audio signal 114 collected by one or more of the microphones 112, (2) the initial identification determined by the first speech recognition engine 202, and (3) the habits of the user identified by the habits engine 206 into the second speech recognition engine 204. At block 412, the voice command controller 128 and/or the voice command controller 318 determines the identified voice command 210. For example, upon applying the second speech recognition engine 204 at block 420, the voice command controller 128 and/or the voice command controller 318 identifies the output of the second speech recognition engine 204 as the identified voice command 210.

At block 422, the voice command controller 128 of the vehicle 100 performs a vehicle function based on the identified voice command 210. For example, the voice command controller 128 instructs and/or otherwise causes one or more of the ECUs 306 to perform a vehicle function that corresponds with the voice command.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise," respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

What is claimed is:

1. A vehicle comprising:
a microphone to collect a signal including a voice command;
a memory; and
a controller configured to:
determine an initial identification of the voice command by feeding the signal into a first automatic speech recognition (ASR) engine, wherein the initial identification of the voice command is a final output of the first ASR engine, wherein to determine the initial identification comprises identifying, via an acoustic model of the first ASR engine, one or more phonemes of a dialect within the signal;
determine habits by feeding user history into a habits engine;
identify, based on determining that a confidence level associated with the initial identification is greater than a confidence threshold and a noise level associated with the initial identification is greater than a noise threshold, the voice command by feeding the signal, the initial identification, and the habits into a second ASR engine, wherein to identify the voice command comprises identifying, via a language model of the second ASR engine, one or more words within the signal by determining word probability distributions based on the one or more phonemes identified by the acoustic model; and
perform a vehicle function based on the voice command.

2. The vehicle of claim 1, wherein the controller utilizes the second ASR engine to identify the voice command responsive to determining that the initial identification corresponds with the confidence level that is less than the confidence threshold.

3. The vehicle of claim 1, wherein the controller identifies the initial identification as the voice command responsive to determining that:
the initial identification corresponds with the confidence level that is greater than the confidence threshold; and
the noise level of the signal is less than the noise threshold.

4. The vehicle of claim 1, wherein the first ASR engine further includes:
the language model.

5. The vehicle of claim 1, wherein the language model includes a deep neural network.

6. The vehicle of claim 1, wherein the habits engine includes a pattern recognition algorithm.

7. The vehicle of claim 1, further including one or more input devices, wherein the controller determines the user history based on user inputs received by the one or more input devices.

8. A system comprising:
a vehicle to operate based on a voice command, the vehicle includes a microphone to collect a signal including the voice command; and
a remote server, in communication with the vehicle, to:
determine an initial identification of the voice command via a first engine based on the signal, wherein the initial identification of the voice command is a final output of the first engine, wherein to determine the initial identification comprises identifying, via an acoustic model of the first engine, one or more phonemes of a dialect within the signal;
determine habits via a habits engine; and
identify, based on determining that a confidence level associated with the initial identification is greater than a confidence threshold and a noise level associated with the initial identification is greater than a noise threshold, the voice command for the vehicle via a second engine based on the signal, the initial identification, and the habits, wherein the first engine is different from the second engine, wherein to identify the voice command comprises identifying, via a language model of the second engine, one or more words within the signal by determining word probability distributions based on the one or more phonemes identified by the acoustic model.

9. The system of claim 8, wherein the remote server utilizes the second engine to identify the voice command responsive to determining that the initial identification corresponds with the confidence level that is less than the confidence threshold.

10. The system of claim 8, wherein the remote server identifies the initial identification as the voice command responsive to determining that:
the initial identification corresponds with the confidence level that is greater than the confidence threshold; and
the noise level of the signal is less than the noise threshold.

11. The system of claim 8, wherein the first engine further includes:
the language model.

12. The system of claim 8, wherein the language model includes a deep neural network.

13. The system of claim 8, wherein the habits engine includes a pattern recognition algorithm.

14. The system of claim 8, wherein the vehicle includes one or more input devices, wherein the remote server determines user history to be fed into the habits engine based on user inputs received by the one or more input devices.

15. A method comprising:
collecting, via a vehicle microphone, a signal that includes a voice command;
determining an initial identification of the voice command by feeding the signal into a first automatic speech recognition (ASR) engine, wherein the initial identification of the voice command is a final output of the first ASR engine, wherein determining the initial identification comprises identifying, via an acoustic model of the first ASR engine, one or more phonemes of a dialect within the signal;
determining habits by feeding user history into a habits engine;

identifying, based on determining that a confidence level associated with the initial identification is greater than a confidence threshold and a noise level associated with the initial identification is greater than a noise threshold, the voice command by feeding the signal, the initial identification, and the habits into a second ASR engine, wherein the first ASR engine is different from the second ASR engine, wherein identifying the voice command comprises identifying, via a language model of the second ASR engine, one or more words within the signal by determining word probability distributions based on the one or more phonemes identified by the acoustic model; and performing, via a processor, a vehicle function based on the voice command.

16. The method of claim 15, wherein the voice command is identified via the second ASR engine responsive to determining that the initial identification corresponds with the confidence level that is less than the confidence threshold.

17. The method of claim 15, further including identifying the initial identification as the voice command responsive to determining that:
the confidence level that is greater than the confidence threshold; and
the noise level of the signal is less than the noise threshold.

18. The method of claim 15, wherein the language model includes a deep neural network.

19. The method of claim 15, wherein the habits engine includes a pattern recognition algorithm.

* * * * *